United States Patent
Bunte et al.

(10) Patent No.: US 11,050,585 B2
(45) Date of Patent: Jun. 29, 2021

(54) DATA TRANSMISSION METHOD AND COMMUNICATIONS NETWORK

(71) Applicant: Beckhoff Automation GmbH, Verl (DE)

(72) Inventors: Thorsten Bunte, Gütersloh (DE); Holger Büttner, Berlin (DE); Dirk Janssen, Verl (DE); Thomas Rettig, Rheda-Wiedenbrück (DE); Hans Beckhoff, Verl (DE); Erik Vonnahme, Salzkotten (DE)

(73) Assignee: Beckhoff Automation Gmbh, Verl (DE)

( * ) Notice: Subject to any disclaimer, the term of this patent is extended or adjusted under 35 U.S.C. 154(b) by 0 days.

(21) Appl. No.: 16/847,898

(22) Filed: Apr. 14, 2020

(65) Prior Publication Data
US 2020/0244480 A1    Jul. 30, 2020

Related U.S. Application Data

(63) Continuation of application No. PCT/EP2018/077861, filed on Oct. 12, 2018.

(30) Foreign Application Priority Data

Oct. 26, 2017   (DE) ................. 10 2017 125 086.7

(51) Int. Cl.
*H04L 29/06* (2006.01)
*H04L 12/40* (2006.01)
(Continued)

(52) U.S. Cl.
CPC ........ *H04L 12/403* (2013.01); *H04L 12/4015* (2013.01); *H04L 12/4625* (2013.01);
(Continued)

(58) Field of Classification Search
CPC .............. H04L 12/403; H04L 12/4015; H04L 12/4625; H04L 2012/40215; H04L 2012/4026; H04L 69/22
See application file for complete search history.

(56) References Cited

U.S. PATENT DOCUMENTS 8,179,923 B2    5/2012 Krause
2002/0110155 A1    8/2002 Pearce et al.
(Continued)

FOREIGN PATENT DOCUMENTS

DE          10018136 A1    10/2001
DE      102014112082 A1     2/2016
(Continued)

*Primary Examiner* — Kent Krueger
(74) *Attorney, Agent, or Firm* — Dorsey & Whitney LLP

(57) ABSTRACT

A communications network having a master subscriber M and at least one slave subscriber. At least one distribution node CU1, CU2, CU3, CU4 is provided which has a plurality of input/output interfaces, each of which is connected to a network segment, the master subscriber M arranged in a first network segment M1 and the slave subscriber arranged in a second network segment S1, S2, S3, S4, S5. Data is exchanged between the master subscriber M and the slave subscriber in the form of telegrams initiated by the master subscriber. The telegrams to be sent from the slave subscriber to the master subscriber are each assigned control data containing a forwarding time information when the corresponding telegram is to be output from the distribution node via the input/output interface in the direction of the first network segment comprising the master subscriber, the forwarding time information determined by the master subscriber M.

16 Claims, 3 Drawing Sheets

(51) Int. Cl.
*H04L 12/403* (2006.01)
*H04L 12/46* (2006.01)
(52) U.S. Cl.
CPC ...... *H04L 69/22* (2013.01); *H04L 2012/4026* (2013.01); *H04L 2012/40215* (2013.01)

(56) References Cited

U.S. PATENT DOCUMENTS

| | | | | |
|---|---|---|---|---|
| 2005/0058149 | A1* | 3/2005 | Howe | H04L 47/17 370/428 |
| 2006/0109866 | A1* | 5/2006 | Janssen | H04L 47/24 370/493 |
| 2013/0124763 | A1* | 5/2013 | Kessler | G06F 13/4282 710/110 |

FOREIGN PATENT DOCUMENTS

| | | | |
|---|---|---|---|
| EP | 2501079 | A1 | 9/2012 |
| WO | 2009121087 | A1 | 10/2009 |

\* cited by examiner

DATA TRANSMISSION METHOD AND COMMUNICATIONS NETWORK

CROSS REFERENCE TO RELATED APPLICATIONS

This application claims priority to international patent application number PCT/EP2018/077,861 filed on 12 Oct. 2018, entitled Data Transmission Method and Communication Network, and German priority application number DE 10 2017 125 086.7, filed 26 Oct. 2017, entitled DATEN UBERTRAGUNGSVERFAHREN UND KOMMUNIKATIONSNETZWERK, which is incorporated by reference herein, in the entirety and for all purposes.

FIELD

The present invention relates to a method for transmitting data in a communications network having at least one distribution node, and to such a communications network.

BACKGROUND

Local communications networks, so-called "local area networks" (LANs), usually comprise one or more servers and workstations referred to as nodes which are connected to each other by a communication-line network, such as a coaxial, fiber optic or twisted-pair cable. Such LANs are operated by a network-operating system and a network protocol.

The most widely used standard for a LAN network protocol is Ethernet, which allows telegrams, also referred to as Ethernet telegrams, with data up to 1500 bytes in length to be transmitted at speeds in the gigabit range. The Ethernet protocol is preferably also used in automation technology, particularly in manufacturing and process automation for exchanging data within the framework of control tasks.

In automation technology, so-called field-bus systems are used as communications networks, in which decentralized devices of a machine periphery such as input and/or output modules, drives and operator terminals are connected to control units via a field bus. On the field bus, the exchanging of data is usually based on the master-slave principle.

The control units on the field bus are usually the active bus subscribers, hereinafter also referred to as master subscribers. They have bus-access rights and determine the data transfer on the field bus. The passive subscribers, also referred to as slave subscribers in the following, are usually the peripheral machine devices. They have no bus-access rights and can only acknowledge received data or transfer data at the request of a master subscriber.

When using communications networks in automation technology, real-time capability of the network protocol should be guaranteed. When controlling machines, the control task is processed cyclically without time fluctuations, e.g., with only slight deviations from the desired cycle time in the range of a few microseconds, wherein a reaction to the standard requirement takes place within a predictable response time.

In order to limit the cycle time of the telegrams in automation-communications networks having a plurality of nodes and thus achieve real-time capability, such automation-communications networks are often structured hierarchically using distribution nodes, also referred to as switches.

The distribution node has several interfaces via which several subscriber lines, also referred to as network segments in the following, are incorporated into the network in a parallel manner. For each network segment, the distribution node usually has at least one input interface and one output interface. These interfaces may be embodied individually or as combined input/output interfaces. The distribution node may also have a majority of input interfaces and/or output interfaces or, respectively, combined input and output interfaces per network segment. Whenever an input/output interface is mentioned in the following, this is always understood to mean all of the above constellations, wherein the optimum design of the input/output interface for the respective application purpose may be chosen when designing the communications network.

The distribution node examines each telegram received on an input/output interface for the address of the addressed subscriber and then forwards the telegram via the assigned input/output interface to which the addressed subscriber is connected.

The distribution node usually works according to the First-In-First-Out (FIFO) principle, in which the telegrams received first are also forwarded first. However, this prevents reliable real-time processing of the telegrams. More recent distribution nodes allow for prioritizing individual telegrams during forwarding in order to guarantee the real-time capability by the automation technology.

Furthermore, distribution nodes are known that forward telegrams at fixed times due to protocol-specific identifiers in order to enable real-time processing. A routing table, also referred to as routing list, is stored in the distribution node which contains a telegram identifier, input/output interfaces and a forwarding time for each real-time relevant telegram.

As a rule, in addition to the real-time relevant telegrams that cyclically contain input/output data of the subscribers, further non-real-time relevant telegrams, which usually contain acyclic parameter data or status data of the subscribers, are received, transmitted and forwarded in the network. For such non-real-time-relevant telegrams, no forwarding time is specified in the routing list of the distribution node.

Apart from using distribution nodes as switches in order to integrate a plurality of further distribution nodes or network segments into the network in parallel, a distribution node may also be used as a synchronization gateway for the master subscriber. The distribution node then only comprises two input/output interfaces for connecting the master subscriber to the network. The intermediate distribution node then serves to synchronize all telegrams of the master subscriber with the network. As the forwarding of the telegrams from one input/output interface to the other input/output interface is fixed in the distribution node, the routing list only contains a forwarding time for each real-time relevant telegram.

In order to ensure that the forwarding of non-real-time-relevant telegrams does not delay the forwarding of real-time-relevant telegrams, a data transmission cycle for the telegrams in the distribution node is usually divided up into three time sections. Such a procedure is described in U.S. Pat. No. 8,179,923 B2.

In a first time section, the so-called cyclic time section, only real-time relevant telegrams may be received and forwarded. In the following second time period, the so-called acyclic time period, non-real-time relevant telegrams are transmitted. In the last third time section, the so-called transition time section, all telegrams may still be received, but no longer be forwarded.

The transition time section, which corresponds at least to the maximum forwarding time for a non-real-time relevant telegram, prevents a delayed transmission of real-time relevant telegrams in the next cyclic time section subsequent thereto by a forwarding process of a non-real-time relevant telegram which is still in progress. The non-real-time relevant telegrams received in the transition-time section are temporarily stored in the distribution node and forwarded in the next acyclic time section.

As each further distribution node may uncontrolledly forward non-real-time relevant messages outside of the cyclic time section, especially in the transition-time section, overload situations of non-real-time relevant telegrams may easily occur in the distribution node. Such overload situations particularly occur if the acyclic time section in the data-transmission cycle is considerably shortened compared to the cyclic time section.

Due to the runtimes within the network and in order to achieve the shortest possible downtimes during data transmission, the real-time relevant telegrams are often not forwarded by the distribution node immediately one after the other in the cyclical time period, but with time gaps in between, the cyclical time period being extended as a result. In such a case, there is the danger that if too many non-real-time relevant telegrams are received in the transition-time section and in the acyclic-time section, the reception buffer for the non-real-time relevant telegrams in the distribution node will overflow.

Furthermore, in the procedure proposed in U.S. Pat. No. 8,179,923 B2, the communications network with the distribution node must always be preset in a configuration phase. If changes occur in the real-time relevant telegrams which are forwarded in the cyclic time section, a new configuration must be generated and stored in the distribution node. Particularly if a plurality of distribution nodes are provided in the communications network, such a configuration change can take up several data-transmission cycles.

In order to reduce the time and effort involved in configuration, DE 100 18 136 A1 proposes a data-transmission method for a communications network having several network segments which are connected to one another via distribution nodes, in which telegrams exchanged between a subscriber in one network segment and a subscriber in another network segment are each assigned control data which contain information on the forwarding process of the telegram by the distribution nodes arranged between the subscribers.

In this context, the control data are modified by each distribution node as the telegram passes through in order to indicate the progress of the telegram during data transmission. However, there is still the danger of collisions occurring between different telegrams in the distribution node, which means that a real-time capability of the data-transmission processes cannot be guaranteed.

SUMMARY

The present invention provides a data transmission procedure for an automation communications network having at least one distribution node and such an automation communications network which enables a simple and reliable transmission of real-time relevant and non-real-time relevant telegrams in the automation communications network.

EXAMPLES

For a data-transmission method having an automation-communications network, hereinafter also simply referred to as a communications network, comprising a master subscriber and at least one slave subscriber, at least one distribution node is provided which has several input/output interfaces, each of which is connected to a network segment, the master subscriber being arranged in a first network segment and the slave subscriber in a second network segment. A data exchange between the master subscriber and the slave subscriber takes place in the form of telegrams, which is initiated by the master subscriber. The telegrams to be transmitted from the slave subscriber to the master subscriber are each assigned control data containing forwarding-time information as to when the corresponding telegram is to be output from the distribution node via the input/output interface in the direction of the first network segment with the master subscriber, the forwarding-time information being determined by the master subscriber.

The connection between an input/output interface of the distribution node and a network segment can be established by connecting the network segment directly to the input/output interface. Further distribution nodes or, respectively, other switching units can also be connected between the input/output interface of the distribution node and the network segment. When referring to an input/output interface, this means that at least one input interface and one output interface are provided. These interfaces may be designed individually or as combined input/output interfaces.

With this procedure, the telegram throughput in the distribution node can be reliably controlled for telegrams transmitted from the slave subscribers to the master subscriber in order to avoid telegram collisions. The telegrams to be transmitted from the slave subscribers to the master subscriber are each assigned control data containing forwarding-time information as to when the corresponding telegram is to be output from the distribution node via the input/output interface to the network segment with the master subscriber.

The forwarding-time information is in this context determined in advance by the master subscriber. This makes it possible for the master subscriber to flexibly plan the exact timing of the telegrams that are forwarded from the slave subscribers to the master subscriber via the distribution node.

In this context, the forwarding-time information does not have to be stored in the distribution node in advance, but can be carried out by the master subscriber according to the actual telegram traffic occurring in each control cycle and transmitted to the distribution node as part of the control data in the telegrams. Due to the possibility of assigning a forwarding-time information to all telegrams, not only cyclic but also acyclic telegrams, overload situations in the distribution node can also be prevented.

In an embodiment, the telegrams are transmitted on a closed data-transmission path starting from the master subscriber to the slave subscriber on a forward run and back on a return path, wherein the master subscriber generates a data header for each telegram to be transmitted from the slave subscriber to the master subscriber, the data header comprising a control section and, adjoining this, a data section for each distribution node to be passed through. The control section contains a telegram identifier. Furthermore, the data section assigned to the distribution node comprises a forwarding information for the telegram which enables the assignment of the input/output interface to which the first network segment with the master subscriber is connected and the input/output interface to which the second network segment with the slave subscriber is connected, and which contains the forwarding-time information when the telegram is to be output from the distribution node via the input/output interface to the first network segment having the master subscriber.

Furthermore, the control section of the telegram can have a counter which, starting from the master subscriber, indicates the number of distribution nodes to be passed through by the telegram up to the slave subscriber, the distribution node decrementing the counter on the way from the master subscriber to the slave subscriber and incrementing the counter on the way back from the slave subscriber to the master subscriber.

In an embodiment, the distribution node takes the data section assigned to the distribution node from the data header of the telegram on the forward run of the telegram from the master subscriber to the slave subscriber when the telegram passes through and, if the counter indicates that no further distribution node is to be passed through, additionally takes the control section from the data header of the telegram, wherein the distribution node, on the return path of the telegram from the slave subscriber to the master subscriber, inserts the data section assigned to the distribution node into the data header of the telegram when the telegram passes, and if the telegram does not have a control section additionally inserts the control section into the data header of the telegram.

The data section in the data header of the telegram may in this context contain a command information which defines the meaning of the further data in the data section, wherein the command information on the way of the telegram from the master subscriber to the slave subscriber indicates to the distribution node that the further data comprise the forwarding information and the forwarding-time information.

Furthermore, the command information on the return path of the telegram from the slave subscriber to the master subscriber may indicate that the further data include diagnostic information.

The communications network is in one version a field-bus system, preferably an Ethernet-based field-bus system, in particular an EtherCAT field-bus system.

BRIEF DESCRIPTION OF THE DRAWINGS

The properties, features and advantages of the present invention described above and the manner in which these are achieved, will become clearer and more comprehensible in conjunction with the following description of exemplary embodiments, which are explained in more detail in connection with the drawings.

DETAILED DESCRIPTION

Figure 1:
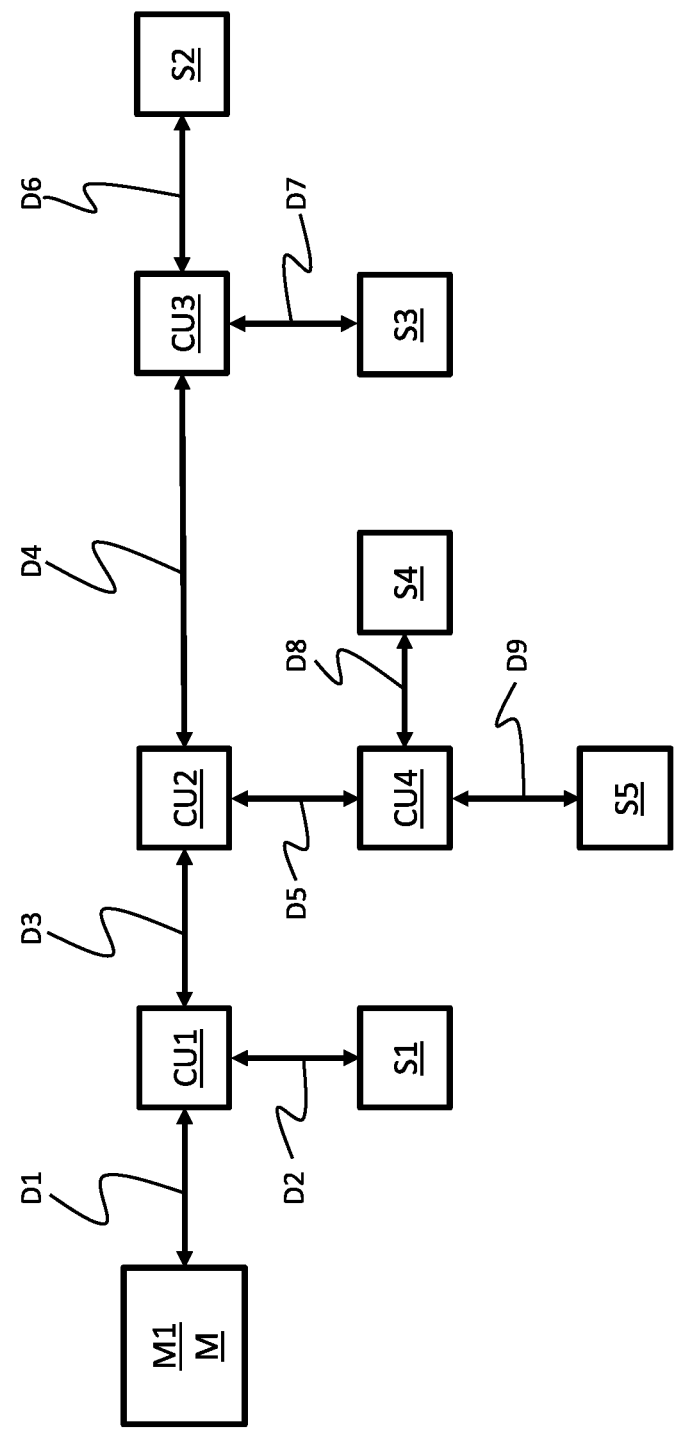
FIG. 1 schematically shows the structure of a master-slave communications network having a plurality of network segments and linked distribution nodes.

The present example of a communications network is used in manufacturing and process automation. However, this indication of use is not to be understood in a restrictive manner, and can be applied to all communications networks in which at least one distribution node is provided which has several input/output interfaces to each of which a network segment is connected.

Communications networks in automation technology are usually embodied as serial field bus systems in which decentralized devices communicate with control units. Thereby, the subscribers are networked via a field bus.

Data between the subscribers are usually exchanged on the basis of the master-slave principle. The active bus subscribers, also known as master subscribers, are the control units that determine the data transfer on the serial field bus. The devices of the machine periphery, also referred to as slave subscribers, on the other hand, are passive bus devices that do not have a bus-access authorization, e.g., they may only acknowledge received messages or transmit messages upon request from a master subscriber. The devices of the machine periphery are, for example, input and/or output components that connect the sensors or actuators of a machine to the field bus. The input and/or output components may also be directly integrated into the sensors or actuators of the machine.

In automation technology, the control is usually carried out by exchanging data via the field bus in such a way that the master subscriber cyclically carries out control processes in order to generate output data for the slave subscribers on the basis of input data from the slave subscribers. The master subscriber outputs the output data in the form of telegrams onto the field bus, the slave subscribers extracting the assigned output data from the telegram in order to execute local subscriber processes by the output data. The data determined by the local subscriber processes are then transmitted back to the master subscriber by the slave subscribers and are then used as input data for the next control process by the master subscriber.

In field bus systems, in addition to telegrams used to carry out control tasks and the data traffic of which is cyclical, further telegrams are usually exchanged in an acyclic data traffic. The acyclic data traffic is used for events in the field-bus system that are not repeated continuously. Acyclic telegrams are, for example, telegrams with parameterization and configuration data and data with diagnostic messages. Unlike cyclic data traffic, acyclic data traffic is not real-time relevant, which is why cyclic telegrams are also referred to as real-time relevant telegrams and acyclic telegrams as non-real-time relevant telegrams.

In order to be able to carry out fast control processes by the field bus system, a short circulation time of the telegrams should be guaranteed. In a field-bus system with a plurality of slave subscribers, branchings are thus generally used in order to shorten the runtime of the telegrams. The field-bus system has one or more distribution nodes in the data transmission path to which several independent network segments are connected.

Field-bus systems with master-slave architecture may be operated by different transmission protocols, wherein protocols based on Ethernet technology are preferred. With Ethernet technology, the data are transmitted in packets. The standard length of an Ethernet telegram is 1518 bytes, with 18 bytes reserved for a header section and an end section. In the header section of the Ethernet telegram, a data field is provided in which it is specified by mean of which Ethernet-protocol type the user data in the Ethernet telegram is to be interpreted.

In automation technology, Ethernet technology preferably uses protocol types that guarantee real-time capability. One such real-time standard is the EtherCAT protocol in which the user data in the Ethernet telegram are processed by the slave subscribers in a continuous process in order to provide a fast industrial Ethernet system.

In this context, datagrams are embedded in the EtherCAT telegram, each comprising a control-data field and a user-data field. The control-data field comprises a command field which indicates the data transmission process to be executed by the assigned slave subscriber with the user-data field, e.g., whether a read process is to be executed in which the slave subscriber is to extract data from the user-data field, or whether a write process in which the slave subscriber is to insert data into the user-data field, or also whether a read/write process in which the slave subscriber is first to extract data from the user-data field and then insert data into the user-data field. In the address field of the control-data field, the slave subscriber or, respectively, the data area in the slave subscriber by which the slave subscriber is to exchange data when passing through the user-data field is predefined.

The slave subscriber starts processing data immediately after receiving the control-data field in the datagram of the EtherCAT telegram and evaluates the command field and the address field. If the slave subscriber is addressed, the slave subscriber extracts the output data intended for the slave subscriber from the user data field in a read datagram or a read/write datagram, while the datagram passes through the slave subscriber in the EtherCAT telegram. In the case of a write datagram or a read/write datagram, the slave subscriber inserts input data into the user data field in the datagram as the datagram passes through. The EtherCAT telegram is only briefly delayed by the slave subscriber during processing of the datagrams.

The following is explained using the example of EtherCAT telegram traffic. However, it is possible to use a different, preferably real-time-capable Ethernet protocol and may also be used in a non-Ethernet-based communications network, in which at least one distribution node is provided which comprises several input/output interfaces, to each of which a network segment is connected, wherein a master subscriber is arranged in a first network segment and at least one slave subscriber is arranged in a second network segment.

In a communications network with a distribution node to which a plurality of network segments are connected, telegrams by which input and output data are exchanged between the master subscriber and the slave subscribers should reach the receiver in good time within a control cycle in order to ensure that real-time communication is guaranteed, as used within the framework of automation technology. In particular, collisions between simultaneously arriving cyclic telegrams in the distribution node should be prevented in this context. Furthermore, overload situations in the distribution node can be caused by acyclic telegrams.

In communications networks with a master-slave architecture, there is a risk of collisions and overload situations in the distribution node, especially in the case of telegrams transmitted from the slave subscribers to the master subscriber. Due to its bus access authorization, the master subscriber can control the timing of the transmission process in such a way that telegram collisions or a telegram overload in the distribution node is avoided. The slave subscribers, on the other hand, who do not have bus access rights themselves, cannot schedule the transmission process, so that telegrams arriving at the distribution node to which several network segments with slave subscribers are connected can arrive simultaneously or, respectively, a telegram overflow may occur.

In order to be able to control the telegram throughput in the distribution node, in particular for telegrams which are transmitted from the slave subscribers to the master subscriber, the telegrams to be transmitted from the slave subscriber to the master subscriber are each assigned control data which contain forwarding-time information as to when the corresponding telegram is to be output from the distribution node via the input/output interface to the network segment with the master subscriber.

The forwarding time information is determined in advance by the master subscriber. This procedure allows the master subscriber to flexibly plan the exact timing of the telegrams which are forwarded from the slave subscriber to the master subscriber via the distribution node.

The forwarding time information does not have to be stored in the distribution node in advance, but can be carried out by the master subscriber according to the actual telegram traffic occurring in each control cycle and transmitted to the distribution node as part of the control data in the telegrams. Due to the possibility of assigning a forwarding-time information to all telegrams, not only cyclic but also acyclic telegrams, overload situations in the distribution node may also be avoided.

FIG. 1 shows an exemplary configuration for a master-slave communications network. The communications network has four distribution nodes CU1, CU2, CU3 and CU4, which are connected via a field bus. The distribution nodes have a memory. The field-bus topology is in this context embodied in such a way that a first network segment M1 comprising the master subscriber M is connected via a first data transmission link D1 to a first input/output interface of the first distribution node CU1. A second input/output interface of the first distribution node CU1 is further connected via a second data transmission path D2 to a second network segment S1 which comprises one or more slave subscribers. Furthermore, the first distribution node CU1 is connected via a third input/output interface and a third data transmission link D3 to a first input/output interface of the second distribution node CU2.

The second distribution node CU2 has a second and third input/output interface, which are connected via a fourth data-transmission link D4 to the first input/output interface of the third distribution node CU3 and via a fifth data-transmission link D5 to the first input/output interface of the fourth distribution node CU4.

The third distribution node CU3 has a second input/output interface to which a third network segment S2 with one or a plurality of slave subscribers is connected via a sixth data transmission link D6, and a third input/output interface to which a fourth network segment S3 with one or more slave subscribers is connected via a seventh data transmission link D7.

The fourth distribution node CU4 comprises a second input/output interface which is connected via an eighth data transmission link D8 to a fifth network segment S4 with one or a plurality of slave subscribers, and a third input/output interface which is connected via a ninth data transmission link D9 to a sixth network segment S5 with one or a plurality of slave subscribers.

In the exemplary configuration shown in FIG. 1 for a master-slave communications network, the network segments M1, S1, S2, S3, S4, S5 each comprise a data-transmission path with one forward and one return path, hereinafter also referred to as outward and return channel. The network segments M1, S1, S2, S3, S4 and S5 thus form a closed data path starting from the input/output interface at the distribution node. The data transmission paths D1, D2, D3, D4, D5, D6, D7, D8 and D9 between the distribution nodes CU1, CU2, CU3, CU4 also have a forward and a return channel. The possibility of bidirectional data transfer between the individual components is indicated by double arrows in FIG. 1.

Data transmission in the communications network may be based on a uniform protocol, for example the EtherCAT protocol. However, it is also possible to mix different protocols in the communications network, e.g., to operate the individual network segments M1, S1, S2, S3, S4, S5 with different protocols. The master subscriber M is then embodied in such a way that it can process all protocols used in the communications network.

In the exemplary configuration, the four distribution nodes CU1, CU2, CU3, CU4 are to be provided. However, it is also possible to use more or less distribution nodes, which may be connected to each other in any way. Furthermore, any number of network segments with slave subscribers may be connected to each distribution node, wherein the individual network segments may have any number of slave subscribers.

In the following, a data exchange between slave subscribers in the third network segment S2 and the master subscriber M based on the EtherCAT protocol is explained by way of example. The master subscriber M places a data header, in the following also called routing header, in front of each EtherCAT telegram, in which at least one slave subscriber in the third network segment S2 is to execute a write operation, e.g., write data into a user-data field of the EtherCAT telegram.

The routing header comprises information for the distribution nodes CU1, CU2, CU3 arranged between the master subscriber M and the slave subscribers in the third network segment S2 via the forwarding of telegrams, e.g., telegram routing, as well as time information on when the telegram is to be forwarded. The master subscriber M may use the routing header to optimize the timing of the telegram traffic in each control cycle.

As the master subscriber M determines the routing in the distribution nodes for all telegrams transmitted by the slave subscribers, e.g., not only for cyclic telegrams but also for acyclic telegrams, telegram collisions and overload situations in the distribution nodes, which can be caused mainly by event-triggered acyclic telegrams, are reliably avoided.

In the exemplary data communication between the master subscriber M and the slave subscribers in the third network segment S2, three distribution nodes CU1, CU2, CU3 are provided between the first network segment M1 having the master subscriber M and the third network segment S2 in the example configuration shown in FIG. 1. The routing header placed in front of the EtherCAT telegram by the master subscriber M then contains a separate data section for each of the three distribution nodes CU1, CU2, CU3.

The respective data section then contains forwarding information for the assigned distribution node CU1, CU2, CU3, which specifies to the distribution node CU1, CU2, CU3 on which input/output interface the telegram is to be output on the forward run. The data section also contains forwarding time information on when the telegram is to be forwarded by the assigned distribution node on the return path.

In addition to a data section for each distribution node CU1, CU2, CU3, the routing header for the EtherCAT telegram comprises a control section placed in front of the data sections which contains a unique telegram identifier and a counter which, starting from the master subscriber M, indicates the number of distribution nodes CU1, CU2, CU3 to be passed through by the telegram up to the third network segment S2 having the slave subscribers, e.g., three distribution nodes CU1, CU2, CU3.

Figure 2A:
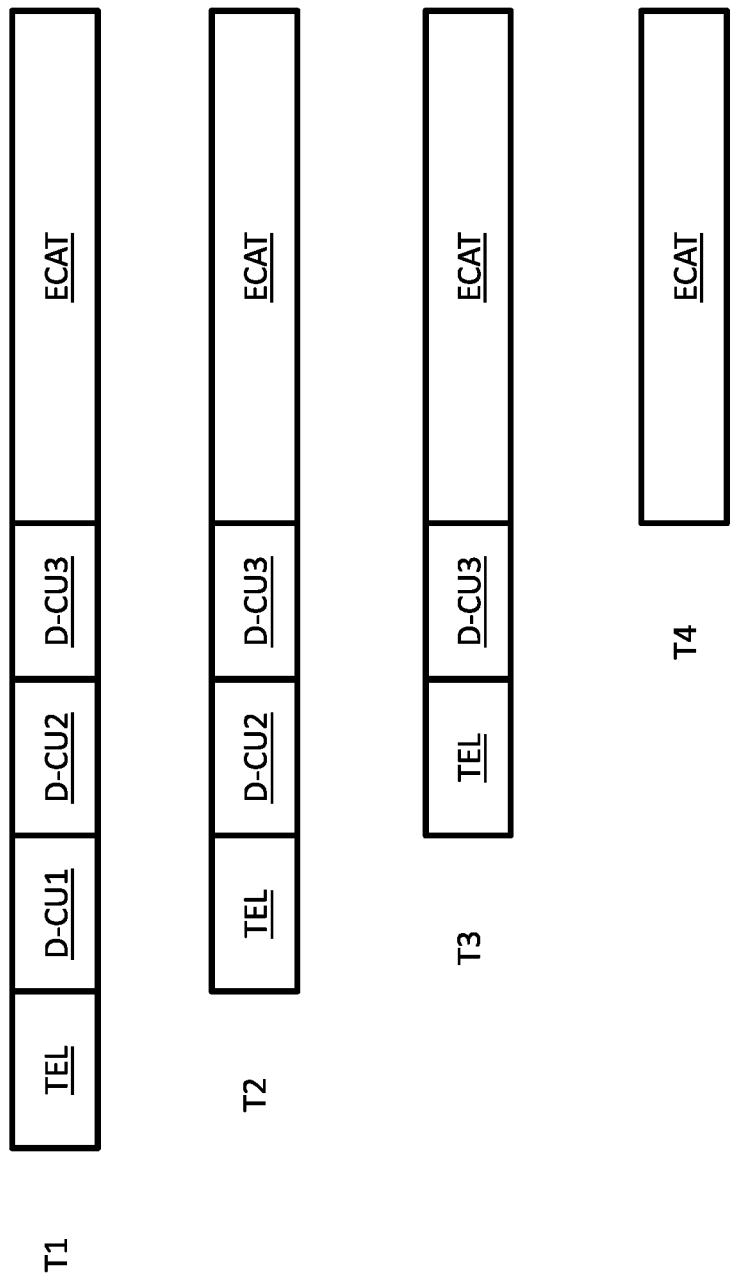
FIG. 2A schematically shows the structure of a telegram for exchanging data between a master subscriber and slave subscribers in the communications network shown in FIG. 1, wherein three distribution nodes are provided between the network segment comprising the master subscriber and the network segment comprising the slave subscribers, and wherein the structure of the telegram is shown after it has passed through the master subscriber and the three distribution nodes on the way there.
Figure 2B:
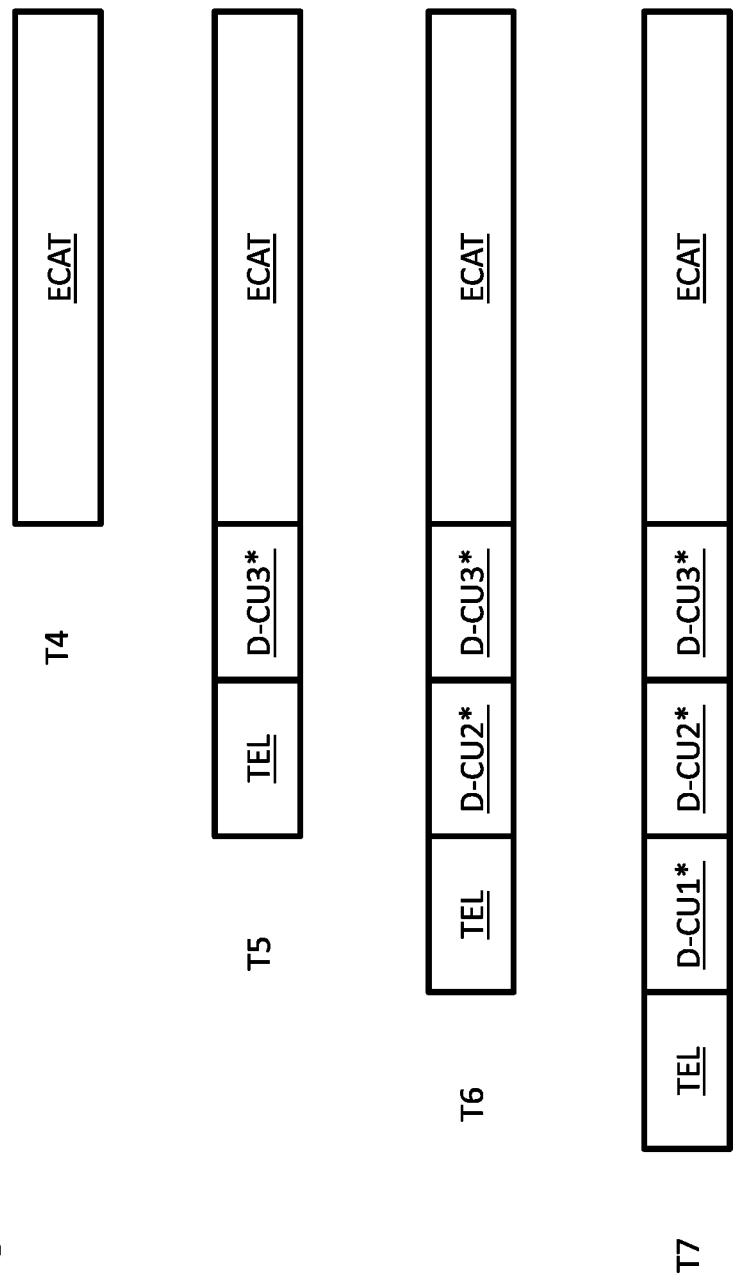
FIG. 2B schematically shows the structure of a telegram for exchanging data between a master subscriber and slave subscribers in the automation communications network shown in FIG. 1, wherein three distribution nodes are provided between the network segment comprising the master subscriber and the network segment comprising the slave subscribers, and wherein the structure of the telegram is shown after it has passed through the slave subscribers and the three distribution nodes on the return path.

FIG. 2A and FIG. 2B schematically show the extended EtherCAT telegram for exchanging data between the master subscriber M and the slave subscribers in the third network segment S2, wherein FIG. 2A shows the telegram on the forward run and FIG. 2B shows the telegram on the way back. FIG. 2A shows the structure of the telegram after it has been output by the master subscriber M and after it has passed through the three distribution nodes CU1, CU2, CU3 on the forward run, and FIG. 2B shows the structure of the telegram after it has been processed by the slave subscribers and after it has passed through the three distribution nodes CU1, CU2, CU3 on the way back.

A first telegram structure T1 in FIG. 2A represents the telegram as it is output by the master subscriber M to the assigned network segment M1 in order to be transmitted via the first data transmission link D1 to the first input/output interface of the first distribution node CM. The routing header placed in front of the EtherCAT telegram ECAT comprises a control section TEL which comprises a telegram identifier and a counter indicating the number of distribution nodes to be passed through. The control section TEL in the routing header is followed by three data sections D-CU1, D-CU2, D-CU3, one data section for each of the distribution nodes CU1, CU2, CU3 in the data transmission path, the data sections being arranged in the order in which the distribution nodes CU1, CU2, CU3 are passed through.

The following Table 1 shows an example of a possible byte structure of the routing header in the first telegram structure T1:

TABLE 1

| Byte number | Header section | Name |
|---|---|---|
| 0-5 | TEL | DEST-MAC-ID |
| 6-7 | TEL | TEL-ID |
| 8 | D-CU1 | CMD (Wert 1) |
| 9 | D-CU1 | PORT (CMD = 1) |
| 10-11 | D-CU1 | RESERVE (CMD = 1) |
| 12-15 | D-CU1 | SEND-BACK-TIME (CMD = 1) |
| 16-23 | D-CU2 | Structured in analogy to D-CU1 |
| 24-31 | D-CU3 | |

Bytes 0 to 7 are reserved for the control section TEL, wherein bytes 0 to 5 comprise the identification information DEST-MAC-ID, which indicates to the distribution node that this is an extended EtherCAT telegram. By the identification information DEST-MAC-ID, the distribution node determines that the telegram has a data section in the routing header which is assigned to the distribution node.

One byte of the identification information DEST-MAC-ID forms a counter which, starting from the master subscriber M, indicates the number of distribution nodes to be passed through by the telegram on its way to the network segment with the slave subscribers.

Furthermore, the DEST-MAC-ID identification information indicates to the distribution node that a telegram identifier follows to identify the telegram. The telegram identification is then contained in bytes 6 and 7 in the control section TEL and is referred to as TEL-ID.

The data sections for the individual distribution nodes, each of which is 8 bytes long, then follow the control section TEL. The table shows in detail the contents of bytes 8 to 15, which form the data section D-CU1 for the first distribution node CU1. Bytes 16 to 23 for the data section D-CU2 of the second distribution node CU2 and bytes 24 to 31 for the data section D-CU3 of the third distribution node CU3 have an analogous structure.

Byte 8 in data section D-CU1 for the first distribution node CU1 is a command byte CMD which defines the meaning of the further bytes in the data section, the command byte CMD being set to the value "1".

Byte 9 of the data section D-CU1 for the first distribution node CU1 specifies the input/output interface, also referred to as PORT, via which the telegram from the distribution node CU1 is to be output on its forward run, e.g., if the command byte CMD has the value "1". Bytes 10 and 11 are intended as reserve bytes and may, for example, contain additional control information for the distribution node CU1.

If the command byte CMD has the value "1", bytes 12 to 15 specify a forwarding time information which determines when the telegram is to be output from the distribution node CU1 to the first input/output interface leading to the first network segment M1 with the master subscriber M on the way back. This forwarding-time information may be in the form of a time specification which specifies the relative time in relation to the time of receipt of the telegram by the distribution node CU1 on the forward run, to which the telegram is then to be forwarded by the distribution node CU1 on the return route. Instead of a relative time specification, an absolute time specification may also be carried out if a time synchronization between the master subscriber M and the distribution nodes CU1, CU2, CU3 is performed, as well. It is also possible, instead of specifying a time, to specify that the telegram should always be forwarded immediately, e.g., without delay.

The telegram having the first telegram structure T1 issued by master subscriber M is then received by the first distribution node CU1 on the forward run, as described above. The distribution node CU1 determines that the telegram has a routing header placed in front of the actual EtherCAT telegram ECAT and then evaluates the routing header, starting with the identification information DEST-MAC-ID in the control section TEL.

By the counter in the DEST-MAC-ID identification information in the TEL control section, the first distribution node CU1 recognizes that two further distribution nodes follow, wherein the counter indicates the total number of distribution nodes to be passed through by the telegram up to the third network segment S2 with the slave subscriber, e.g., three distribution nodes in the example.

The first distribution node CU1 then decrements the counter in the identification information DEST-MAC-ID in the control section TEL of the routing header and extracts the data section D-CU1 assigned to the first distribution node, which follows the control section TEL in the routing header, from the telegram. The first distribution node CU1 stores the data section D-CU1 taken from the telegram in its memory, wherein the first distribution node CU1 additionally stores the telegram identifier TEL-ID from the control section TEL and the first input/output interface on which the telegram was received.

At the same time, the first distribution node CU1 forwards the telegram shortened by the extracted data section D-CU1, which is shown in FIG. 2A as second telegram structure T2, via the third input/output interface of the first distribution node CU1 specified in the data section D-CU1. The shortened telegram is then transferred to the second distribution node CU2 via the third data transfer path D3 and the first input/output interface of the second distribution node CU2 and received by it.

The second distribution node CU2 processes the shortened telegram with the second telegram structure T2 analogously to the processing of the telegram with the first telegram structure T1 in the first distribution node CU1. In this context, the second distribution node CU2 evaluates the routing header put in front of the actual EtherCAT telegram ECAT and determines on the basis of the counter in the identification information DEST-MAC-ID in the control section TEL that another distribution node follows. The distribution node CU2 then decrements the counter in the identifier information DEST-MAC-ID in the control section TEL of the routing header and extracts the data section D-CU2 assigned to the second distribution node CU2, which follows the control section TEL in the routing header of the shortened telegram.

The second distribution node CU2 stores the assigned data section D-CU2 in its memory, wherein, in addition, the telegram identifier TEL-ID from the control section TEL and the input/output interface on which the shortened telegram was received are stored in the memory of the second distribution node CU2. The second distribution node CU2 then forwards the again shortened telegram, which is represented in FIG. 2A as the third telegram structure T3, on the second input/output interface of the second distribution node CU2 specified in the assigned data section D-CU2. The again shortened telegram is then transmitted via the fourth data transmission section D4 and the first input/output interface of the third distribution node CU3 to the latter and received by it.

The third distribution node CU3, in which the again shortened telegram with the third telegram structure T3 is now present, proceeds in the same way as the processing of the telegram with the first telegram structure T1 in the first distribution node CU1 or, respectively, in the same way as the processing of the shortened telegram with the second telegram structure T2 in the second distribution node CU2, and evaluates the routing header of the again shortened telegram starting with the identification information DEST-MAC-ID in the control section TEL. The third distribution node CU3 thereby determines by the counter in the DEST-MAC-ID identification information of the control section TEL that no further distribution node follows. The third distribution node CU3 therefore not only extracts the assigned data section D-CU3, which follows the control section TEL in the routing header, from the further shortened telegram, but the control section TEL, as well, so that the entire routing header is removed from the further shortened telegram and the telegram is reduced to the EtherCAT telegram ECAT, as shown in FIG. 2A in the fourth telegram structure T4.

The third distribution node CU3 stores the data section D-CU3 taken from the again shortened telegram, the telegram identifier TEL-ID and the input/output interface on which the further shortened telegram was received in its memory. Furthermore, the third distribution node CU3 stores further control information from the EtherCAT telegram ECAT, which can be used to identify the EtherCAT telegram ECAT. The third distribution node CU3 can, for example, use the DEST-MAC-ID (ECAT) contained in the ECAT EtherCAT telegram itself.

At the same time, the third distribution node CU3 outputs the telegram shortened by the complete routing header according to the fourth telegram structure T4, e.g., the EtherCAT telegram ECAT, via the second input/output interface of the third distribution node CU3.

Starting from the second input/output interface at the third distribution node CU3 in conjunction with the sixth data-transmission path D6, the third network segment S2 with its slave subscribers forms a closed data path or, respectively, a data-transmission path with a forward and a return channel. The telegram with the EtherCAT telegram ECAT is processed on the third network segment S2 by the slave subscribers, usually on the forward channel. However, the ECAT EtherCAT telegram can also be processed on the return channel or on both the forward and the return channel.

The slave subscribers extract the output data assigned to the respective slave subscriber by the master subscriber M from the ECAT EtherCAT telegram or, respectively, in return, insert input data for the master subscriber M into the EtherCAT telegram ECAT, depending on whether a read process, a write process or a read/write process is to be executed.

After processing of the EtherCAT telegram ECAT by the slave subscribers in the third network segment S2, the EtherCAT telegram ECAT according to the fourth telegram structure T4 is again present at the second input/output interface of the third distribution node CU3. FIG. 2B again shows the telegram with the EtherCAT telegram ECAT according to the fourth telegram structure T4, which after processing by the slave subscribers in the third network segment S2 arrives at the second input/output interface of the third distribution node CU3 on the return channel.

On the return path of the telegram to the master subscriber M, the telegram is once more supplemented with the routing header, which the three distribution nodes CU3, CU2, CU1, which are to be passed through in reverse order, successively add to the telegram during telegram throughput.

The third distribution node CU3, which has received the processed telegram as described above via its second input/output interface, identifies the telegram according to the fourth telegram structure T4. For telegram identification, the third distribution node CU3 uses the additionally stored control information of the EtherCAT telegram ECAT, for example the DEST-MAC-ID (ECAT) which is contained in the EtherCAT telegram ECAT itself.

The third distribution node CU3 then supplements the EtherCAT telegram ECAT with the control section TEL, which contains the identification information DEST-MAC-ID indicating to the distribution node that the telegram has a data section in the routing header that is assigned to the distribution node, and the telegram identification TEL-ID. In the identification information DEST-MAC-ID, the third distribution node CU3 increments the counter which indicates the total number of distribution nodes through which the telegram has passed.

In addition, the third distribution node CU3 inserts a data section D-CU3* into the telegram after the control section TEL, whereby the command byte CMD, which determines the meaning of the further bytes in the data section, is set to the value "2". This indicates that the subsequent bytes in the data section D-CU3* are to be interpreted on the way back compared to the data section D-CU3 on the way there.

The third distribution node CU3 then outputs the completed telegram, which has the fifth telegram structure T5 shown in FIG. 2B, on the stored first input/output interface on which the again shortened telegram having the third telegram structure T3 was received on the forward run. In this context, the third distribution node CU3 determines the forwarding time for the supplemented telegram on the basis of the stored forwarding information which the third distribution node CU3 has extracted from the assigned data section D-CU3 on the forward run.

The supplemented telegram comprising the routing header, which comprises the control section TEL and the data section D-CU3*, is then transmitted to the second input/output interface of the second distribution node CU2 via the fourth data transmission link D4. The second distribution node CU2 then processes the routing header in the supplemented telegram by the second distribution node CU2 in the control section TEL incrementing the counter again. Furthermore, the second distribution node CU2 inserts a further data section D-CU2* after the control section TEL and in front of the data section D-CU3* in the routing header, in which the command byte CMD which determines the meaning of the further bytes in the data section is again set to the value "2".

The second distribution node CU2 then forwards the again supplemented telegram, which has the sixth telegram structure T6 shown in FIG. 2B, on the stored first input/output interface on which the shortened telegram was received on the forward run, the forwarding time being determined by the forwarding information extracted from the data section D-CU2 on the forward run.

The first distribution node CU1 then receives the again supplemented telegram that was transmitted via the third data-transmission link D3 and the third input/output interface of the first distribution node CU1. The first distribution node CU1 then proceeds in the same way as the second distribution node CU2 when processing the supplemented telegram and increments the counter in the control section TEL in the again supplemented telegram after evaluation of the control section TEL. Furthermore, the first distribution node CU1 supplements the routing header with a data section D-CU1*, in which the value of the command byte CMD is set to "2", the data section D-CU1* being inserted into the routing header directly after the control section TEL and in front of the other data sections D-CU2*, D-CU3*.

The first distribution node CU1 outputs the complete telegram, which is shown in FIG. 2B as the seventh telegram structure T7, on the stored first input/output interface. The telegram is now complete again and its structure corresponds to the telegram with the first telegram structure T1. The forwarding time for the complete telegram is determined by the forwarding information which was taken from the data section D-CU1 on the forward run.

The master subscriber M may then receive the complete telegram via the first data transmission section D1 and process it further.

The following Table 2 shows the routing header of the telegram according to the telegram structure T7.

TABLE 2

| Byte number | Header section | Name |
|---|---|---|
| 0-5 | TEL | DEST-MAC-ID |
| 6-7 | TEL | TEL-ID |
| 8 | D-CU1 | CMD (Wert 2) |
| 9-11 | D-CU1 | RESERVE (CMD = 2) |

TABLE 2-continued

| Byte number | Header section | Name |
| --- | --- | --- |
| 12-15 | D-CU1 | RECEIVE-TIME (CMD = 2) |
| 16-23 | D-CU2 | Structured in analogy to D-CU1 |
| 24-31 | D-CU3 | |

The byte structure of the routing header in the complete telegram received by the master subscriber M thereby corresponds to the byte structure of the routing header in the telegram sent by the master subscriber M, whereby the control section TEL is identical and has the identification information DEST-MAC-ID as bytes 0 to 5, in which the associated counter indicates the number of distribution nodes that have been passed through, e.g., three distribution nodes. Bytes 6 and 7 in the control section TEL indicate the telegram identifier TEL-ID which identifies the telegram.

The data sections D-CU1, D-CU2, D-CU3 of the distribution nodes CU1, CU2, CU3 follow in the routing header, wherein the first distribution node CU1 occupies bytes 8 to 15, the second distribution node CU2 bytes 16 to 25 and the third distribution node CU3 bytes 24 to 31.

The byte structure is given in detail for the data section D-CU1 of the first distribution node CU1. Byte 8 specifies the command information CMD which shows the meaning of the following bytes in the routing header. The value 2 of the command information CMD in this context indicates that bytes 9 to 11 are reserve data and bytes 12 to 15 indicate the receiving time in the first distribution node CU1, which is indicated as the time that has elapsed between the receipt of telegram T1 on the forward run and the receipt of the telegram on the way back. Instead of a relative time, an absolute time may also be indicated if a time synchronization is additionally carried out between the master subscriber M and the distribution nodes CU1, CU2, CU3.

The data exchange described above is optimised for the EtherCAT protocol, in which the telegram can only be processed by the slave subscribers without the routing header. The routing header is therefore, as explained above, successively removed from the telegram and temporarily stored by the distribution nodes on the forward run, and then reinserted into the telegram on the way back. The distribution nodes thereby determine the forwarding time for the telegram on the return path on the basis of the forwarding time information which is specified in the data section assigned to the respective distribution node in the routing header.

However, if instead of the EtherCAT protocol a protocol is used for data exchange in which the slave subscribers can also process the routing header, it is not necessary for the distribution nodes to remove the assigned data section from the routing header or, respectively, for the last distribution node in front of the slave subscribers to remove the entire remaining routing header on the forward run. The routing header may subsequently always remain at the telegram and is only evaluated by the distribution nodes.

With a correspondingly designed protocol for data exchange and correspondingly embodied slave subscribers, it is also possible that the slave subscribers evaluate the routing header sent by the master subscriber with the telegram and then convert it into an own telegram to transmit it to the master subscriber.

Generally, for the distribution nodes to be passed through by the telegram, forwarding time information indicating when the telegram is to be output on the input/output interface is only used for the return path from the slave subscribers to the master subscriber. Collisions between telegrams on the return path may be avoided in this way, as the master subscriber may control the telegram output in such a way that no collisions occur. However, in order to achieve an optimized telegram throughput in the distribution node, it is also possible to send forwarding time information for the distribution nodes for the telegram output via the input/output interface on the forward run, as well.

The invention is described in detail by preferred embodiments and examples. Other embodiments and examples are also encompassed, which can comprise further modifications or combinations of described features. For this reason, the invention is not limited by the disclosed examples, and a person skilled in the art can derive other variations therefrom, without having to depart from the scope of protection of the invention as claimed.

The advantageous designs and extensions of the invention described above and/or reproduced in the claims can be applied individually or in any combination with one other except, for example, as expressly recited in the dependent claims and expressly exclusive alternatives.

The invention claimed is:

1. A method for transmitting data in a communications network having at least one distribution node which has a plurality of input/output interfaces which are each connected to a network segment, a master subscriber being arranged in a first network segment and at least one slave subscriber being arranged in a second network segment,
wherein data is exchanged between the master subscriber and the slave subscriber in the form of telegrams, the data exchange being initiated by the master subscriber,
wherein the telegrams to be transmitted from the slave subscriber to the master subscriber are each assigned control data which contain forwarding-time information as to when the corresponding telegram is to be output from the distribution node via the input/output interface in the direction of the first network segment comprising the master subscriber, and
wherein the forwarding-time information is determined by the master subscriber.

2. The method according to claim 1, wherein the telegrams are transmitted on a closed data transmission path starting from the master subscriber to the slave subscriber on a forward run and back on a return path, wherein the master subscriber generates a data header for each of the telegrams to be transmitted from the slave subscriber to the master subscriber, the data header comprising a control section and, adjoining it, a data section for each distribution node to be passed through,
wherein the control section contains a telegram identifier, and
wherein the data section assigned to the distribution node contains forwarding information for the telegram, which allows for assigning the input/output interface to which the first network segment comprising the master subscriber is connected and the input/output interface to which the second network segment comprising the slave subscriber is connected, and which contains the forwarding time information as to when the telegram is to be output from the distribution node via the input/output interface in the direction of the first network segment comprising the master subscriber.

3. The method according to claim 2, wherein the control section of the telegram has a counter which, starting from the master subscriber, indicates the number of distribution nodes to be passed through by the telegram on the way to the slave subscriber, the distribution node decrementing the counter while the telegram passes through on the way from the master subscriber to the slave subscriber and incrementing the counter on the way back from the slave subscriber to the master subscriber.

4. The method according to claim 3, wherein the distribution node, on the forward run of the telegram from the master subscriber to the slave subscriber extracts the data section from the data header of the telegram and, when the counter indicates that no further distribution node is to be passed through, additionally extracts the control section from the data header of the telegram, and wherein the distribution node, on the return path of the telegram from the slave subscriber to the master subscriber, inserts the data section assigned to it into the data header of the telegram as the telegram passes through, and, if the telegram does not comprise a control section, additionally inserts the control section into the data header of the telegram.

5. The method according to claim 4, wherein the data section in the data header of the telegram contains command information which defines the meaning of the further data in the data section, wherein the command information on the way of the telegram from the master subscriber to the slave subscriber indicates to the distribution node that the further data comprise the forwarding information and the forwarding-time information.

6. The method according to claim 5, wherein the command information on the return path of the telegram from the slave subscriber to the master subscriber indicates to the distribution node that the further data comprise diagnostic information.

7. A communications network comprising a first network segment in which a master subscriber is arranged, and at least one second network segment in which at least one slave subscriber is arranged, and at least one distribution node, which has a plurality of input/output interfaces, a first input/output interface being connected to the first network segment and a second input/output interface being connected to the second network segment,
   wherein the master subscriber is designed to initiate an exchange of data with the slave subscriber in the form of telegrams,
   wherein the telegrams to be transmitted from the slave subscriber to the master subscriber are each assigned control data which contain forwarding-time information as to when the corresponding telegram is to be output by the distribution node via the input/output interface in the direction of the first network segment comprising the master subscriber, and
   wherein the master subscriber is embodied to determine the forwarding-time information.

8. The communications network according to claim 7, wherein the telegrams are transmitted on a closed data transmission path starting from the master subscriber to the slave subscriber on a forward run and back on a return path,
   the master subscriber being embodied in such a way that it generates a data header record for each telegram to be transmitted from the slave subscriber to the master subscriber, the data header comprising a control section and, subsequent thereto, a data section for each distribution node to be passed through,
   wherein the control section contains a telegram identifier, and
   wherein the data section assigned to the distribution node comprises forwarding information for the telegram, which allow for assigning the input/output interface to which the first network segment with the master subscriber is connected and the input/output interface to which the second network segment is connected to the slave subscriber, and which contains the forwarding time information as to when the telegram is to be output from the distribution node via the input/output interface in the direction of the first network segment with the master subscriber.

9. The communications network according to claim 8, wherein the control section of the telegram comprises a counter which, starting from the master subscriber, indicates the number of distribution nodes through which the telegram is to pass on its way to the slave subscriber, wherein the distribution node is embodied to decrement the counter on the telegram flow on the way from the master subscriber to the slave subscriber and to increment the counter on the return path from the slave subscriber to the master subscriber.

10. The communications network according to claim 9, wherein the distribution node is designed, on the forward run of the telegram from the master subscriber to the slave subscriber, to extract the respectively assigned data section from the data header of the telegram and, if the counter indicates that no further distribution node is to be passed through, to additionally extract the control section from the data header of the telegram, and wherein the distribution node is embodied to insert the respectively assigned data section into the data header of the telegram on the return path of the telegram from the slave subscriber to the master subscriber while the telegram passes through, and if the telegram does not have a control section, to additionally insert the control section into the data header of the telegram.

11. The communications network according to claim 7, wherein the automation communications network is an Ethernet-based field bus system, in particular an EtherCAT field bus system.

12. A communications network comprising a first network segment in which a first subscriber is arranged, and at least one second network segment in which at least one second subscriber is arranged, and at least one distribution node, which has a plurality of input/output interfaces, a first input/output interface being connected to the first network segment and a second input/output interface being connected to the second network segment,
   wherein the telegrams to be transmitted from the second subscriber to the first subscriber are each assigned control data which contain forwarding-time information as to when the corresponding telegram is to be output by the distribution node via the input/output interface in the direction of the first network segment comprising the first subscriber,
   wherein the first subscriber is a master subscriber and the second subscriber is a slave subscriber,
   wherein the master subscriber is embodied, wherein the master subscriber is embodied to initiate data exchange with the slave subscriber in which the telegrams are transmitted from the slave subscriber to the master subscriber upon request by the master subscriber, and
   wherein the master subscriber is embodied to determine the forwarding-time information for the telegrams transmitted from the slave subscriber to the master subscriber, in which the control data respectively assigned to the telegrams and comprising the forwarding-time information are generated upon request of the master subscriber and are contained in the request.

13. The communications network according to claim 12, wherein the telegrams are transmitted on a closed data transmission path starting from the master subscriber to the slave subscriber on a forward run and back on a return path,
- the master subscriber being embodied in such a way that it generates a data header record for each telegram to be transmitted from the slave subscriber to the master subscriber, the data header comprising a control section and, subsequent thereto, a data section for each distribution node to be passed through,
- wherein the control section contains a telegram identifier, and
- wherein the data section assigned to the distribution node comprises forwarding information for the telegram, which allow for assigning the input/output interface to which the first network segment with the master subscriber is connected and the input/output interface to which the second network segment is connected to the slave subscriber, and which contains the forwarding time information as to when the telegram is to be output from the distribution node via the input/output interface in the direction of the first network segment with the master subscriber.

14. The communications network according to claim 13, wherein the control section of the telegram comprises a counter which, starting from the master subscriber, indicates the number of distribution nodes through which the telegram is to pass on its way to the slave subscriber, wherein the distribution node is embodied to decrement the counter on the telegram flow on the way from the master subscriber to the slave subscriber and to increment the counter on the return path from the slave subscriber to the master subscriber.

15. The communications network according to claim 14, wherein the distribution node is designed, on the forward run of the telegram from the master subscriber to the slave subscriber, to extract the respectively assigned data section from the data header of the telegram and, if the counter indicates that no further distribution node is to be passed through, to additionally extract the control section from the data header of the telegram, and wherein the distribution node is embodied to insert the respectively assigned data section into the data header of the telegram on the return path of the telegram from the slave subscriber to the master subscriber while the telegram passes through, and if the telegram does not have a control section, to additionally insert the control section into the data header of the telegram.

16. The communications network according to claim 12, wherein the automation communications network is an Ethernet-based field bus system, in particular an EtherCAT field bus system.

* * * * *